(12) United States Patent
Lagosanto et al.

(10) Patent No.: US 7,003,663 B2
(45) Date of Patent: Feb. 21, 2006

(54) DISTRIBUTION OF DEPLOYMENT INFORMATION FOR REMOTE APPLICATIONS

(75) Inventors: Laurent Lagosanto, Marseilles (FR); Jean-Jacques Vandewalle, Marseilles (FR)

(73) Assignee: Gemplus, Gemenos Cedex (FR)

( * ) Notice: Subject to any disclaimer, the term of this patent is extended or adjusted under 35 U.S.C. 154(b) by 914 days.

(21) Appl. No.: 09/742,394

(22) Filed: Dec. 22, 2000

(65) Prior Publication Data
US 2002/0083322 A1   Jun. 27, 2002

(51) Int. Cl.
*H04L 9/00* (2006.01)
*G06F 7/04* (2006.01)

(52) U.S. Cl. .............................. 713/159; 726/2; 726/20

(58) Field of Classification Search ........ 713/200–202, 713/159, 172, 192–194, 150; 340/506; 705/37; 707/9, 1, 10, 104.1; 709/217–219, 229; 711/100
See application file for complete search history.

(56) References Cited
U.S. PATENT DOCUMENTS

| | | | |
|---|---|---|---|
| 6,055,518 A * | 4/2000 | Franklin et al. ............... 705/37 |
| 6,216,227 B1 * | 4/2001 | Goldstein et al. ........... 713/172 |
| 6,438,550 B1 * | 8/2002 | Doyle et al. .................... 707/9 |
| 6,549,773 B1 * | 4/2003 | Linden et al. ............ 455/426.1 |
| 6,686,838 B1 * | 2/2004 | Rezvani et al. ............. 340/506 |

* cited by examiner

*Primary Examiner*—Hosuk Song
(74) *Attorney, Agent, or Firm*—Buchanan Ingersoll PC

(57) ABSTRACT

Smart cards and other such devices with limited memory capacity function as hosts for services on a distributed computing network. The information to be deployed in the distributed computing system to provide access to those services is separated into two categories. One category consists of the information that is generic to all instances of the service. The second category constitutes that information which is specific to one instance of the application which provides a service. The specific information is stored on the smart card, whereas the generic information is stored elsewhere on the distributed computing network, for example on a server. In addition to the specific information, the card stores the address at which the generic information can be located on the network. When a card is inserted in a terminal connected to the network, the terminal retrieves the specific deployment information, along with the address for the generic information. The generic information is then retrieved, validated by the card, and combined with the specific information to construct a service bundle. This service bundle is then uploaded to an appropriate location on the network, to thereby advertise the availability of the service, as well as provide all of the necessary information to access the service.

27 Claims, 3 Drawing Sheets

DISTRIBUTION OF DEPLOYMENT INFORMATION FOR REMOTE APPLICATIONS

FIELD OF THE INVENTION

The present invention is directed to distributed computing, and more particularly to an information deployment mechanism that enables smart cards and other devices with limited amounts of available memory to operate as service providers in a distributed computing environment.

BACKGROUND OF THE INVENTION

With the increasing power and decreasing size of successive generations of microprocessor chips, the ability to provide distributed computing on a wide-scale basis is becoming a practical reality. Generally speaking, distributed computing, or more generally ubiquitous computing, refers to an environment in which programs make calls to remote address spaces that are outside of the particular address space within which the programs are executing. The address space to which the call is made may be located on a different machine from the one on which the calling program resides. As one example, a vehicular navigation program that is executing on a microprocessor within an automobile may make a call to a remote traffic reporting service, to obtain information about traffic congestion that can be displayed to the driver of the automobile.

To facilitate the implementation of a distributed computing environment, various frameworks have been developed. One example of such a framework that is adapted to the Java programming language is known as the Jini technology, developed by Sun Microsystems. In a framework of this type, processing resources provide services that can be employed by clients. The processing resources may be located anywhere on a communications network. The particular location of the service provider, as well as the network that is employed to deliver the services, can be transparent to the client. Thus, in the example given above, the navigation program located in a particular automobile functions as a client of a traffic reporting service. The particular location of the traffic reporting service and the type of network used to provide its information to the client, e.g. a cellular telephone system, need not be known to the client. These implementation details are abstracted by the distributed computing framework.

In general, it is desirable for a distributed computing system to implement an open architecture, whereby new services and new clients can be dynamically added to the system. In such an arrangement, the clients do not have prior knowledge about the services, particularly the message structure of calls that need to be made to access the services. To support such a dynamic, open environment, distributed computing frameworks such as the Jini technology provide a mechanism whereby, when a device which offers one or more services is connected to the network, it advertises the availability of its services, and uploads objects which implement the interfaces necessary to access those services. For example, if a printer is connected to the network, it may upload its printer driver and its interface. It may also upload attributes about the service, such as whether it supports a given page description language or color printing.

When a client desires to use a service, it can check the attributes to make sure the functions it needs are supported. If so, the stored object is copied to the device where the client resides. In the preceding example, therefore, the printer driver and the interfaces are downloaded. Thereafter, the client can employ one of the downloaded interfaces to make the appropriate calls to the desired service. This type of distributed computing infrastructure relies upon code mobility to enable clients to employ services on the network without pre-installing or loading drivers or other software associated with those services. Whenever a new service is to be made available on a network, the service deploys the necessary data, e.g. the appropriate interfaces, that enable remotely located clients having no prior knowledge of the service to use it.

It is desirable to be able to use a variety of different type of devices as hosts for services in a distributed computing system. One device of particular interest is a smart card, i.e. a card containing a microprocessor and associated memory. In the case of a smart card which supports the Java programming language, for instance, applets stored on the card can be designated as personal services. Due to the security that is inherently associated with a smart card, it provides a particularly suitable platform for services where data is only to be accessed by trusted entities. One example of such a service is an electronic purse application. In an online purchasing transaction, a vendor can operate as a client of the electronic purse service, to obtain funds for a completed transaction. Because of the security provided by a smart card, assurance can be provided that only authorized vendors will have access to the funds in the electronic purse. The portability of the smart card readily lends itself to use in a distributed computing environment, so that the issuer of the card, e.g. a bank, can authorize access to funds in the electronic purse from wherever the owner may be located.

One difficulty associated with the use of smart cards as service providers in a distributed computing environment, however, relates to the information that must be deployed within the distributed computing framework to enable clients to access the service. Specifically, smart cards have a limited amount of memory that is available to store the application programs that implement the services. As a result, there may not be sufficient memory capacity to also store the information that needs to be deployed throughout the distributed computing environment to enable clients to access the service. For instance, a given service may have a number of different interfaces associated with it, to accommodate different types of clients. If a given smart card contains multiple applications that provide various services, it may not be possible to store all of the interfaces associated with these services, that need to be uploaded to the distributed computing infrastructure, in the limited amount of memory that is available on the card. Similar limitations are also associated with other portable types of devices having a relatively small amount of internal memory capacity, such as personal digital assistants (PDAs) and cellular phones.

A second concern associated with the use of smart cards is the fact that many terminals that receive smart cards are specific to one application on the smart card. For instance, an automated teller machine may have knowledge about a banking application on the card, but does not know how to access other applications that might also be on the card, such as a phone/address book, etc. Hence, even if the machine is connected to a distributed computing network, it cannot be used to provide services associated with these other applications via such a network.

Accordingly, it is desirable to provide devices having limited amounts of available memory, such as smart cards, personal digital assistants, and the like, with the ability to function as hosts for services within a distributed computing environment.

SUMMARY OF THE INVENTION

In accordance with the present invention, these objectives are achieved by separating the information to be deployed in a distributed computing system into two categories. One category consists of the information that is generic to all instances of the service. The second category constitutes that information which is specific to one instance of the application which provides a service. The specific information is stored on a portable device such as a smart card, PDA, or the like, whereas the generic information is stored elsewhere on the distributed computing network, for example on a server. In addition to the specific information, the portable device stores the address at which the generic information can be located on the network. When the portable device is connected to the distributed computing network, e.g. a smart card is inserted in a terminal connected to the network, the terminal retrieves the specific deployment information, along with the address for the generic information. The generic information is then retrieved, and combined with the specific information to construct a service bundle. This service bundle is then uploaded to an appropriate location on the network, to thereby advertise the availability of the service, as well as provide all of the necessary information to access the service.

As a further feature of the invention, a terminal or other device on the network functions as a gateway for the smart card application. When the generic information for the service bundle is retrieved for publication on the network, additional information is retrieved which enables the gateway to communicate with the application on the smart card. As a result, the terminal need not be tailored to specific applications. Rather, the information needed for any given application is retrieved as needed.

Further features of the invention, as well as the advantages provided thereby, are described in detail hereinafter with reference to specific embodiments illustrated in the accompanying drawings.

DETAILED DESCRIPTION

To facilitate an understanding of the present invention, it is described hereinafter with specific reference to examples in which a smart card functions as the platform for hosting services provided within a distributed computing system. Further in this regard, occasional reference is made to specific examples associated with application programs written in an object-oriented programming language, such as Java, and distributed computing frameworks for such applications, such as the Jini Network Technology. It will be appreciated, however, that these examples are presented merely for illustrative purposes, and should not be viewed as limiting the scope of the invention. Rather, the principles which underlie the invention can be applied to a variety of different types of devices in addition to smart cards, such as personal digital assistants, cellular telephones, networkable appliances, and the like. Similarly, distributed computing systems other than those adapted to object-oriented programming techniques can be used to implement the features of the invention.

Figure 1:
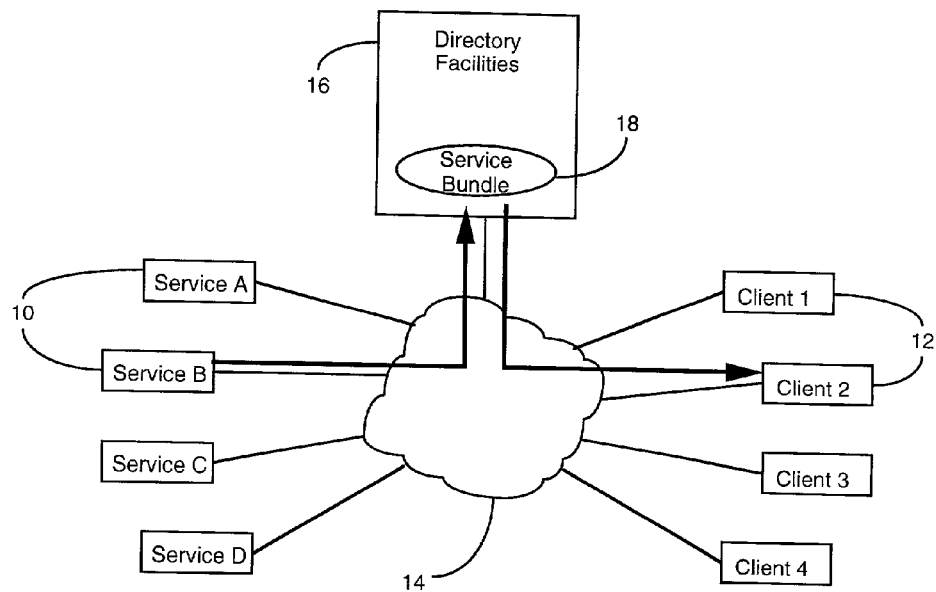
FIG. 1 is a general block diagram of a distributed computing system of a type in which the present invention can be implemented.

A general overview of a distributed computing infrastructure, in which the present invention can be implemented, is illustrated in FIG. 1. The basic components of a distributed computing system comprise one or more devices which function as hosts 10 for services to be provided, and other devices which execute the clients 12 that utilize those services. The hosts 10 and the clients 12 interact with one another through a suitable communication network 14. This communication network can take any of a variety of forms, such as a local area network, a wide area network, the Internet, a mobile telephone network, or the like. In the illustrative example of FIG. 1, each of the hosts 10 and clients 12 are represented as being associated with different respective devices. In practice, however, this need not be the case. Rather, a single device may provide the platform for multiple services, multiple clients, and/or a combination of services and clients.

When a client has prior knowledge of a particular service, the client may contain all information necessary to access the service. Typically, this information comprises an interface that describes the entry points for the application that provides the service. In an object-oriented environment, for example, the interface comprises a list of available methods that can be invoked from the application.

To facilitate an environment in which new services can be dynamically added to a distributed computing network, a framework is provided that enables the services to advertise their availability whenever their host device is connected to the network. One such framework is provided by the Jini technology developed by Sun Microsystems. This technology provides an infrastructure having directory facilities 16 with which devices and services register. When a device 10 which hosts one or more services is connected to the network, it locates the directory facilities and, for each of its services, uploads a service bundle 18 that implements the services' interfaces. To use a service, a client locates it using the directory facilities. The service's bundle 18 is copied from the directory facilities server 16 to the device 12 on which the client resides. Hence, the directory facilities server functions as an intermediary, to connect a client with a desired service. Compatibility between clients and services is ensured in this type of environment, since each service deploys all of the information that is needed to interact with it, via the service bundle 18. When the host device is disconnected from the network, its service bundle 18 is removed from the server, so that clients do not attempt to access services that are no longer available.

Figure 2:
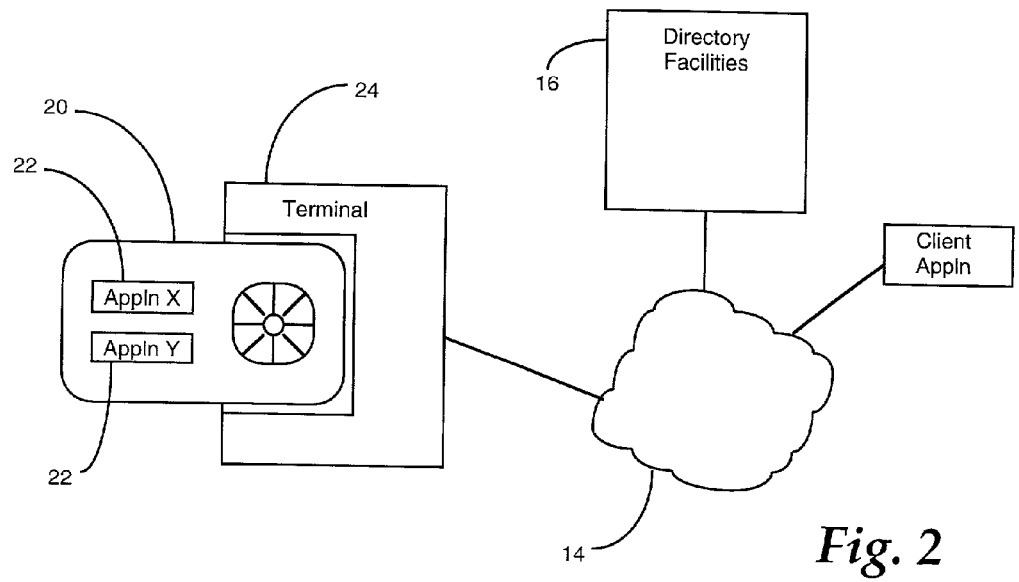
FIG. 2 is a schematic block diagram illustrating the manner in which a smart card can be employed in a distributed computing system.

The present invention is particularly directed to the use of devices having limited amounts of memory as hosts for services in a distributed computing system. Examples of such devices include smart cards, personal digital assistants (PDAs), cellular telephones, and the like. FIG. 2 illustrates an example in which a smart card is employed as the host device. The smart card 20 contains one or more application programs 22, each of which provides a service that can be made available through the distributed computing network. To provide these services, the smart card is inserted into a terminal 24 that communicates with the network. Typically, the terminal contains the appropriate hardware and software to supply power to the smart card, as well as obtain initial information regarding the type of card e.g. the manufacturer and/or issuer of the card, and the communication protocol(s) employed by the card. In the context of a distributed computing network, the terminal also obtains the information regarding the card's services which is to be deployed in the distributed infrastructure. In other words, the terminal registers with the directory facilities 16 and uploads the appropriate service bundle pertaining to the card's services.

To utilize the services provided by an application 22 on a host device, such as a smart card, the clients make appropriate calls to the application. In the context of an object-oriented program, for example, these calls are typically made by invoking methods on the application. One technique for performing remote method invocation to an application stored on a smart card is described in copending, commonly assigned application Ser. No. 09/740,986, the disclosure of which is incorporated herein by reference. As described in detail therein, in order to access the services provided by an application, the client needs to be aware of the particular methods that can be invoked. Typically, this awareness is provided by means of an interface, which provides a definition of the various methods that can be invoked, as well as the arguments or parameters associated with each method. In the technique described in the foregoing application, a card applet proxy functions to convert requests to invoke methods on the applet into low-level communication messages that can be understood by the smart card. For a client to be able to access the services of an application on a smart card, therefore, it must be programmed with the interface and the proxy, or otherwise be able to obtain the interface and the proxy. In the context of a distributed computing system, the clients are able to obtain the interface, attribute information and, if needed, the proxy by means of a service bundle 18 which is uploaded to a directory facilities server 16 by the application that provides the desired service.

If this information that is to be deployed on the distributed computing network is completely stored within the smart card 20, it can consume a significant amount of memory which could be used for other purposes. For instance, multi-application cards, which are capable of hosting multiple different types of services, are envisioned. However, if each application is required to store all of the deployment information, as well as the implementation of the application itself, the number of applications that can be stored on the card is constrained, due to the limited amount of memory available on the card. To overcome this constraint, the present invention functions to reduce the amount of information that needs to be stored on the card, and thereby frees some of the memory for other uses. This reduction in on-card storage requirements is achieved by dividing the information to be deployed into different categories. One category of deployment information comprises that information which is generic to all of the cards that host a particular type, or class, of service. The other category of information comprises that information which is specific to a particular card.

Figure 3:
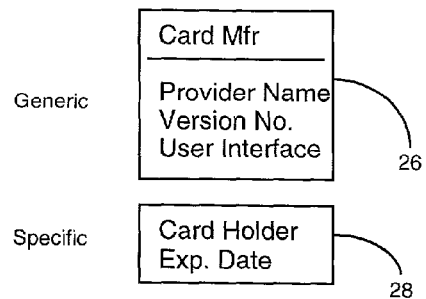
FIG. 3 is a block diagram illustrating the separation of deployment information into generic and specific categories.

Referring to FIG. 3, one example of the categorization of the deployment information is illustrated. In general, the deployment information can be viewed as consisting of three basic types, (1) input information which is dependent upon the device itself, (2) information that is dependent on the type, or class, of application, and (3) information that is dependent upon a specific instance of the application. The first two types of information constitute generic information 26. For instance, information dependent on a smart card could include the identification of the card manufacturer. Information that is dependent upon the type of application could include the name and other attributes of the issuer or provider of the application, the version number for the application, and a user interface. The third type of information, namely that which is dependent upon an application instance, falls into the specific category 28. This information could include the name of the card holder, the expiration date of the card or service, and identification of the service.

Figure 4:
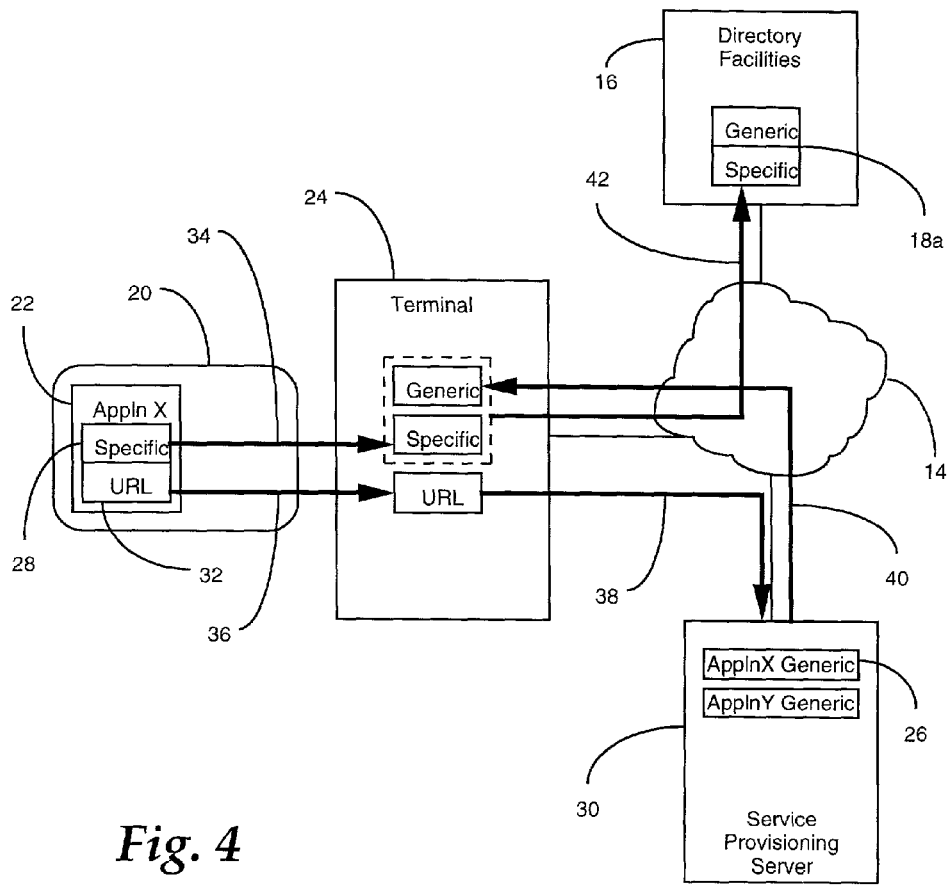
FIG. 4 is a schematic block diagram of a distributed computing system in which a smart card constitutes a host for services.

In accordance with the present invention, these two different categories of information are stored at separate locations. The specific information 28 that relates to a particular instance of the application is stored on the card itself. However, the generic information 26 is stored off the card, at a location that is accessible via the distributed computing network. Referring to FIG. 4, the generic information for an application can be stored on a service provisioning server 30. The card 20 stores the implementation of the application 22, including the specific deployment information 28. In addition, the card stores an address 32, e.g. a uniform resource locator (URL), that identifies a location at which the generic deployment information 26 for the application is stored on the server 30.

In operation, when a card 22 is inserted in a terminal 24, the card and the terminal first proceed through a typical initialization procedure, wherein the card is powered up and the terminal obtains information necessary to communicate with the card. Thereafter, the terminal interrogates the card to determine services that are hosted by the card. For each such service, the card provides the specific deployment information 28 (step 34), and the URL 32 which identifies the location of the generic deployment information (step 36). Using the URL 32, the terminal 24 locates the generic information 26 on the deployment server 30 (step 38), and downloads this information (step 40). The generic information 26 and the specific information 28 are then combined in the terminal 24, and uploaded to the directory facilities 16 as a service bundle 18a (step 42).

As part of this process, the smart card can validate the generic information that is received from a remote server before it is added to the service bundle that is published on the network. For example, prior to storing the generic information 26 on the server 30, it can be encrypted or digitally signed, using a private or public key. When the information is subsequently retrieved from the server in response to the URL 32 provided by a card, the card can check the digital signature and/or decrypt the file, using a private key stored in its memory. Once the information has been validated in this manner, it can then be combined with the specific information 28 to form the service bundle 18a.

Figure 5:
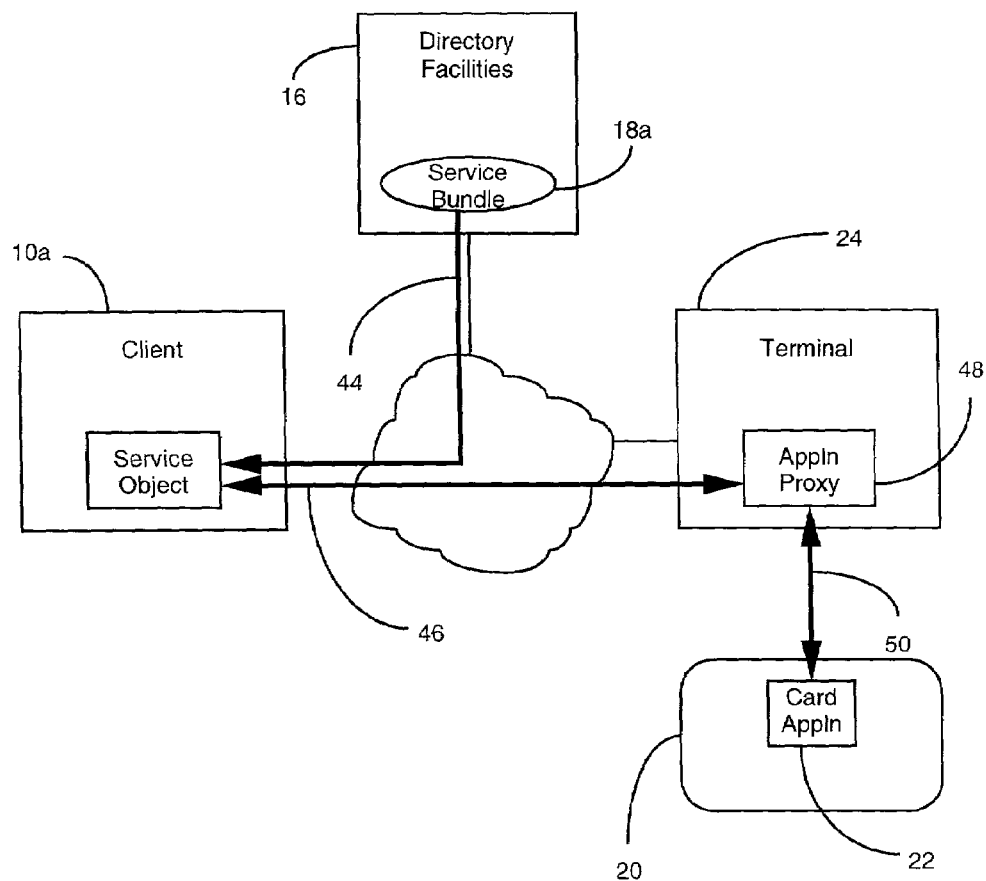
FIG. 5 is a schematic block diagram illustrating the use of a gateway host to communicate with a card application.

One of the items of information that can be obtained from the service provisioning server is a proxy that converts procedure calls or remote method invokation calls from the client into commands that are appropriate for communicating with the card 20. In addition to uploading this proxy to the facilities directory server 16 as part of the service bundle 18a, the terminal 24 can function as a gateway host, i.e. it enables access to the card application 22 from the network. Referring to FIG. 5, when a client 10a desires a service provided by the card, it downloads the service bundle 18a for that service, from the facilities directory 16 (step 44). Using the information provided by the service bundle, the client 10a issues calls to invoke methods on the application 22 that provides the service (step 46). These calls are received by a gateway, e.g. the terminal 24, and provided to a proxy 48 obtained from the service provisioning server 30.

The proxy then converts these calls into the appropriate commands that are provided to the card 22, to be processed by the application 22 (step 50).

Hence, the gateway bridges the platform of the smart card and the distributed computing technology. Since it receives the proxy and any other information necessary to interact with the application from the service provisioning server, it need not be tailored to any specific application. As such, it facilitates an open environment that enables new applications, and hence new services, to be dynamically added to the network.

The terminal 24 may contain all of the information necessary to interrogate the card 20, to determine its available services. As additional services become available, however, it may not be possible to provide each terminal with the necessary interrogation capabilities. In this case, these capabilities can likewise be stored on a separate server accessible via the network 14, and downloaded as needed. For example, when a card is first inserted into the terminal, the initialization process identifies the type of card that has been inserted, for example its manufacturer and/or issuer. Based upon this information, the terminal can access a server associated with that type of card, and request the information that enables it to interact with the card, and obtain the deployment data. This information could be stored on the service provisioning server 30, or on a separate server that is associated with the particular type of card.

From the foregoing, it can be seen that the present invention provides a mechanism by which smart cards and other types of devices having limited memory capabilities can be successfully employed as hosts for services on a distributed computing network. This capability is achieved by minimizing the amount of deployment information that needs to be stored on the device itself. By separating the deployment information into device and generic categories, much of the information can be stored at a location that is accessible via the network, but off the device itself. By combining the generic and specific information, the terminal is able to upload a service bundle that meets all of the requirements for providing services within the framework of the distributed computing network. Furthermore, by downloading data for communicating with an application on the device, the terminal can operate as a gateway for the application in an open development environment.

It will be appreciated by those of ordinary skill in the art that the present invention can be embodied in other forms, without departing from the spirit or essential characteristics thereof. For example, while specific embodiments of the invention have been described with reference to its implementation in a smart card, it will be appreciated that a variety of different types of devices which have limited memory capacity can benefit from the principles which underlie the invention. Similarly, while the smart card is shown as being physically connected to the network by means of a terminal, wireless communications can also be utilized to connect a portable service provider to the network. The foregoing description is therefore considered in all respects to be illustrative, and not restrictive. The scope of the invention is indicated by the appended claims, and all changes that come within the meaning and range of equivalence thereof are intended to be embraced therein.

What is claimed is:

1. A method for providing services on a distributed computing network, comprising the steps of:
   connecting a first device containing an application associated with a service to a distributed computing network;
   reading from said first device a first set of information, that is published on the network to provide clients with access to the service, and an address, said address being associated with a second set of information that is published on the network to provide clients with access to the service;
   using said address to read said second set of information from a second device connected to the network; and
   publishing a service bundle on said network that contains at least some of the information from each of said first and second sets of information.

2. The method of claim 1 wherein said first set of information contains data which is specific to the implementation of the application on said first device, and said second set of information contains data which is generic to multiple implementations of the application.

3. The method of claim 1 wherein said first device is a smart card.

4. The method of claim 3 wherein said smart card is connected to the network by means of a terminal, and wherein some of the information read from said second device comprises a proxy for said application, and further including the step of executing said proxy in said terminal to enable said terminal to function as a gateway for the application on the network.

5. The method of claim 4 wherein said proxy operates to convert calls received from clients via the network into commands that are appropriate to the application.

6. The method of claim 5 wherein said application is written in an object-oriented program language, and said proxy converts requests for remote method invocation into low-level commands for communication with a smart card.

7. The method of claim 1 wherein said first device is a personal digital assistant.

8. The method of claim 1 further including the step of validating said second set of information with information stored in said first device prior to publishing said service bundle.

9. The method of claim 8 wherein said second set of information includes a digital signature, and said validating step comprises authentication of said signature by means of a key stored on said first device.

10. The method of claim 8 wherein said second set of information is encrypted, and said validating step comprises decrypting said information using a key stored on said first device.

11. A method for providing services via a smart card on a distributed computing network, comprising the steps of:
    placing a smart card containing an application that is associated with a service in communication with a first device on the network;
    reading an address from the smart card;
    using said address to obtain a proxy for said application from a second device on the network; and
    executing said proxy on said first device to thereby enable said first device to operate as a gateway which receives calls for said application from clients on the network and converts said calls into commands that are transmitted to the card for processing by said application.

12. The method of claim 11 wherein said first device is a terminal to which said smart card is physically connected.

13. The method of claim 11 wherein said application is written in an object-oriented program language, and said proxy converts requests for remote method invocation into low-level commands for communication with a smart card.

14. A portable service provider that is connectable to a distributed computing network, said portable service provider including a memory having stored therein:
- an application program that provides services to clients via said network;
- a first set of information that is published on the network and that contains data which is specific to the implementation of the application on said service provider, to provide clients with access to the service provided by said application program; and
- an address for a location on the network at which is stored a second set of information that is published on the network and that contains data which is generic to multiple implementations of the application, to provide clients with access to said service.

15. The portable service provider of claim 14 wherein said service provider is a smart card.

16. The portable service provider of claim 14 wherein said service provider is a personal digital assistant.

17. The portable service provider of claim 14 wherein said memory further stores a private key for validating said second set of information.

18. A distributed computing network, comprising:
- a first device that publishes information that enables clients on said network to access services available via said network;
- a second device that stores a first portion of said information; and
- a third device that communicates with a portable service provider containing an application that provides services via said network, said third device being operable to retrieve a second portion of said information from said portable service provider, read an address stored in said portable service provider that identifies a location at which said first portion of said information is stored, retrieve said first portion of said information stored at said address, and provide said first and second portions of said information to said first device for publication on the network.

19. The distributed computing network of claim 18 wherein said portable service provider is a smart card, and said third device is a terminal to which a smart card can be connected.

20. The distributed computing network of claim 19 wherein some of the information contained in said first portion comprises a proxy for said application, and said terminal executes said proxy to function as a gateway for the application on the network.

21. The distributed computing network of claim 20 wherein said proxy operates to convert calls received from clients via the network into commands that are appropriate to the application.

22. The distributed computing network of claim 21 wherein said application is written in an object-oriented program language, and said proxy converts requests for remote method invocation into low-level commands for communication with a smart card.

23. The distributed computing network of claim 18, wherein said third device combines the retrieved first and second portions of information into a service bundle that is provided to said first device for publication.

24. The distributed computing network of claim 18 wherein said first portion of said information comprises data which is generic to multiple implementations of said application, and said second portion of said information comprises data that is specific to the implementation of the application on a given portable service provider.

25. A distributed computing network, comprising:
- a first device that stores a proxy for an application stored on a portable service provider; and
- a second device that communicates with a portable service provider, and that is operable to read an address stored in said portable service provider that identifies a location at which said proxy is stored, retrieve said proxy stored at said address, and execute said proxy to function as a gateway which receives calls for said application from clients on the network and converts said calls into commands that are transmitted to said portable service provider for processing by said application.

26. The distributed computing network of claim 25 wherein the portable service provider is a smart card and said second device is a terminal to which a smart card can be connected.

27. The distributed computing network of claim 25, wherein said application is written in an object-oriented program language, and said proxy converts requests for remote method invocation into low-level commands for communication with a portable service provider.

* * * * *